Dec. 29, 1953  G. W. CAPLIS  2,664,544
TESTING AND PACKING FIXTURE
Filed Sept. 30, 1952  2 Sheets-Sheet 1
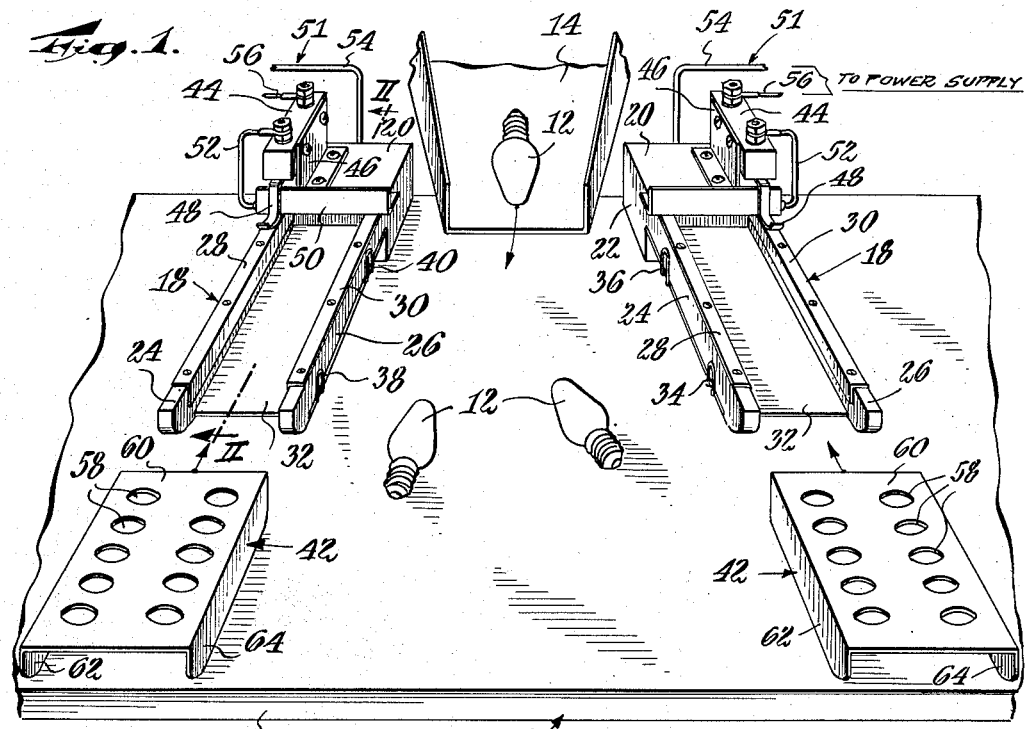
Fig. 1.
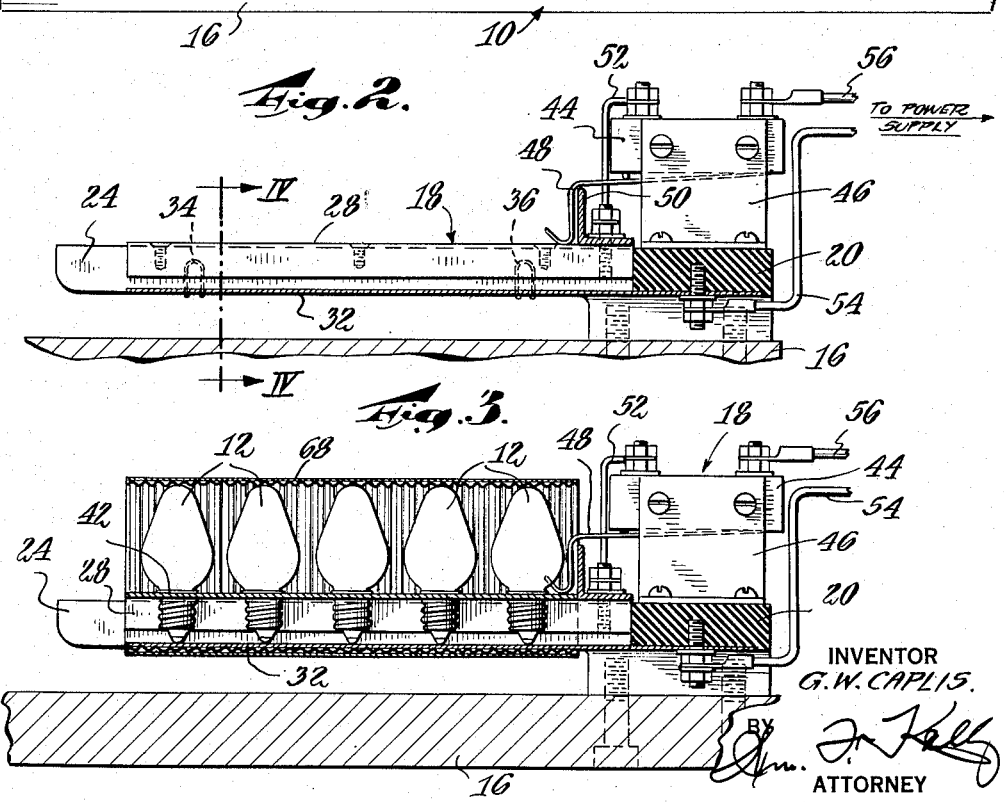
Fig. 2.
Fig. 3.
INVENTOR
G. W. CAPLIS.
BY
ATTORNEY Dec. 29, 1953 — G. W. CAPLIS — 2,664,544
TESTING AND PACKING FIXTURE
Filed Sept. 30, 1952 — 2 Sheets-Sheet 2

INVENTOR
G. W. CAPLIS.
BY
ATTORNEY

Patented Dec. 29, 1953

2,664,544

UNITED STATES PATENT OFFICE 2,664,544

TESTING AND PACKING FIXTURE

George W. Caplis, Clifton, N. J., assignor to Westinghouse Electric Corporation, East Pittsburgh, Pa., a corporation of Pennsylvania Application September 30, 1952, Serial No. 312,275

8 Claims. (Cl. 324—21)

This invention relates to testing and packing and, more particularly, to a fixture for testing and packing small incandescent lamps.

In the past, considerable time has been lost in the separate and distinct hand operations of inspecting, testing, and packing small incandescent lamps after the basing operation has been completed. The lamps has been fed from the basing machine by a delivery funnel onto an inspection and testing table, where they are picked up by the operator by hand and inserted into a multiple position inspection block. During the transfer from the table to the block they are visually inspected for obvious defects, bulb coating, filament alignment, base soldering, etc. On the block, which consists of a plurality of sockets the lamps are screwed in and electrically tested for illumination purposes.

Meanwhile, a packing platform is inserted and fitted by hand over a loading block adjacent the inspection block. After test on the inspection block, lamps are again transferred by hand and inserted into the packing platform on the loading block. A flattened wrapper from a pile stacked near the loading block is removed therefrom and pushed against a stop on the packing table to assume the square cross section or carton shape required to fit about the now loaded wrapper platform on the loading block. The now formed wrapper is then inserted over the loaded platform and the packed set of lamps removed therefrom.

From the above it is obvious that the inspecting, testing and packing operation is not only tedious, labor consuming with excessive and unnecessary motions, but capable only of handling the based lamp production of one machine. Hence, it has been found advantageous to provide a testing and packing fixture in which the lamps are simultaneously tested and arranged on the platform ready for wrapper insertion. This fixture forms a guide around which the wrapper slides. Upon withdrawing the wrapper the lamps and platform are in their proper position in the wrapper ready for carton packing. Due to the increased speed of inspecting, testing and packing, it is now possible to pack and test many times the number of lamps handled in the prior art method and apparatus. It is also now possible to handle the basing output from several machines at one central packing and testing area with a single operator.

The testing and packing fixture of my invention comprises a pair of longitudinal guide rails of suitable insulating material having metallic base shell contact bars or angles thereon and joined together at their bottoms by a metallic contact eyelet plate, a platform and wrapper stop transverse the inner ends of said rails, a microswitch for closing the testing circuit upon insertion of a platform on the guide rails, platform ears on the outside of said guides for contouring the side members of the platform to the sides of the guides, and means for mounting said fixture to a testing and packing table.

In its general aspect, the present invention has as its object the elimination of the disadvantages and defects of the prior art method and apparatus for testing and packing small incandescent lamps.

A specific object of the present invention is a testing and packing fixture which increases inspecting, testing and packing speeds for small incandescent lamps.

A further object is a testing and packing fixture having a pair of longitudinal guide rails joined together by a metallic contact eyelet plate and provided with metallic base shell contact bars, a platform and wrapper stop across the inner ends of said rails, platform ears on said guides for aligning the side members of said platform adjacent the sides of said guides, a microswitch for closing the testing circuit upon insertion of a platform upon the guides, and means for mounting said fixture on a mounting and testing table.

Other objects of the present invention will appear to those skilled in the art as the description proceeds, both by direct recitation thereof and by implication from the context.

Referring to the accompanying drawing, in which like numerals of reference indicate similar parts throughout the several views:

Fig. 1 is a perspective view of a testing and packing station having a pair of testing and packing fixtures of my invention mounted on a table.

Fig. 2 is a side elevational view, partially in section on the line II—II of Fig. 1, of one of the testing and packing fixtures of my invention.

Fig. 3 is a view similar to Fig. 2 and showing inspected, tested, and packed lamps ready for removal from said fixture.

Figure 4:
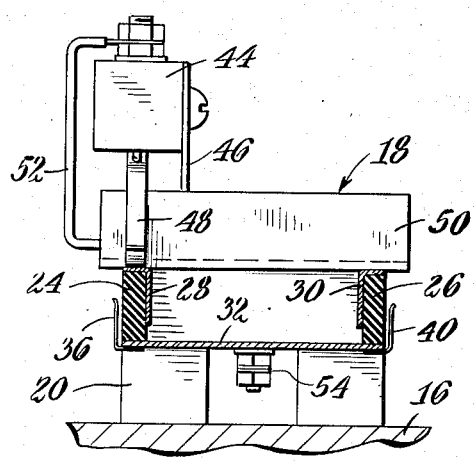
Fig. 4 is a sectional view, on the line IV—IV of Fig. 2, in the direction of the arrows, showing the fixture prior to the loading of a platform thereon.

Referring to the drawing, and more particular, to Fig. 1, testing and packing apparatus embodying my invention is designated by the reference numeral 10. This apparatus may comprise, as shown in Fig. 1, means for delivering based lamps 12, such as in the case shown, a chute or funnel 14 to a testing and packing table 16. Adjacent each side of the funnel 14, and extending substantially transverse of the table 16, are a pair of testing and packing fixtures 18.

Each of the fixtures 18 may suitably comprise a body 20 of insulative material, such as wood or "micarta," having two projecting platform guide rails 24 and 26 extending forward from the body 20 and suitably elevated a sufficient clearance distance above the upper surface of the table 16. The rails 24 and 26 are provided with metallic angle or base shell contact bars, 28 and 30 respectively, substantially covering the upper and inner surface of each rail. The bottom portions of the rails 24 and 26 are connected by a metallic base eyelet contact plate 32. Secured to the plate 32 and projecting upwardly adjacent the outer side wall of each rail is a pair of platform side wall ears 34 and 36 on the rail 24, and 38 and 40 on the rail 26 for guiding the side walls of lamp packing platforms 42, as hereinafter explained.

Adjacent the rail 24 and the angle 28, a microswitch 44 is mounted on the upper surface of the body 20 by means of a bracket 46. A microswitch contact arm 48 of suitable resilient material depends below the body of the switch 44 and engages the angle 28 in the unloaded position, as shown in Figs. 2 and 4. Adjacent the forward portions of the body 20, a combination stop and connecting bar 50 extends transversely across the angles 28 and 30.

An electrical testing circuit 51 for each fixture 18 has a suitable line 52 which electrically connects one side of the switch 44 to the connecting bar 50 and hence the angles 28 and 30. Another line 54 extends from the base contact eyelet plate 32 to one side of a power supply. The other side of the switch 44 is connected by a line 56 to the other side of the power supply.

Each platform 42, has a plurality of lamp packing holes 58 formed in its top portion 60, and depending side walls or runners 62 and 64.

Operation

Figure 5:
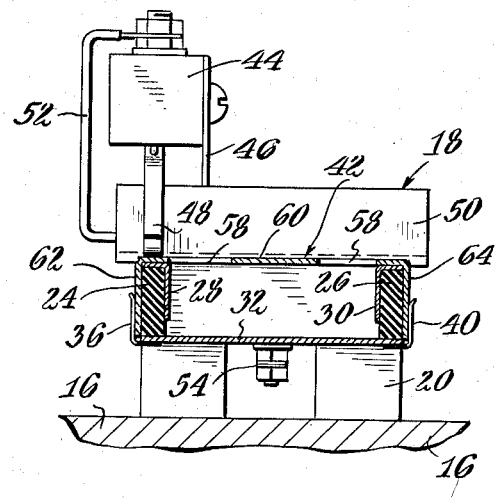
Fig. 5 is a view similar to Fig. 4, but showing a platform in place on the fixture of my invention.

An operator positions a platform 42 on the guide rails 24 and 26 of each of the testing and packing fixtures 18 shown in Fig. 5. The side members 62 and 64 are secured by the ears 34, 36, 38 and 40 against the outer side walls of the guide rails 24 and 26. It will be understood that as the forward portion of the top 60 of the platform 42 engages the stop 50, the switch contact arm 48 is moved upwardly thereby, thus completing electrical testing circuit 51.

Figure 6:
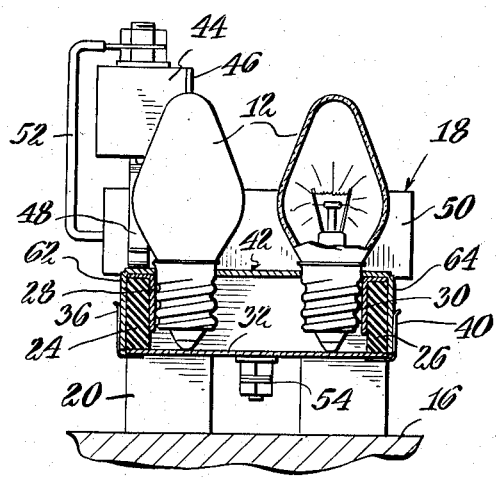
Fig. 6 is a view similar to Figs. 4 and 5, but showing lamps in position for electrical testing.
Figure 7:
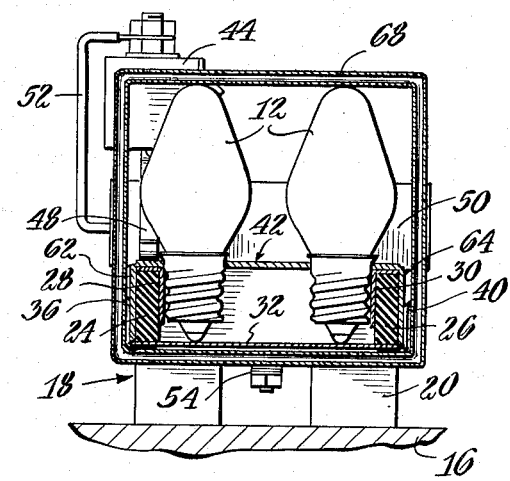
Fig. 7 is a view, also similar to Figs. 4, 5 and 6, but showing a packing wrapper in place over the now loaded and tested lamps on the platform.

Based lamps 12, fed by the funnel 14 onto the table 16 are visually inspected and inserted by the operator (Fig. 6) into the holes 58 of the platforms 42 on the fixture 18. As each lamp is inserted, it will be understood that its shell contacts the inner or vertically depending portion of the particular contact bar 28 or 30, thus making electrical contact therewith. The base eyelet in turn contacts the eyelet plate 32 also making electrical contact therewith. Since the electrical testing circuit 51 is now energized, if the lamp is satisfactory it will light, as shown in Fig. 6, and remain lit until removal of the platform 42 from the fixture 18. If the lamp 12 fails to light, the operator removes the defective lamp therefrom and inserts a new one in the hole 58.

Figure 8:
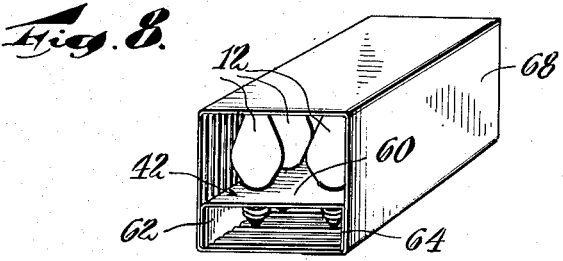
Fig. 8 is a perspective view of tested and packed lamps after removal from the fixture of my invention.

When the platform 42 is completely filled with visually inspected and tested lamps 12, a packing wrapper 68 from a stacked pile of flat wrappers adjacent the fixtures 18, is removed therefrom by hand and pushed against a suitable stop (not shown) to form the collapsed wrapper 68, formed of corrugated paper, into its packing or square cross sectional form. A wrapper is then inserted over each of the pairs of rails 24, 26 and the lamps 12 on the platforms 42, until they contact the stops 50 on the inner ends of said rails. Due to the wrapper corrugations, the loaded platform 42 makes a good frictional contact with the wrapper 68 and can be readily removed thereby from the fixture 18, thus completing the enclosing of the lamps, as shown in Fig. 8, for packing in a larger carton.

Although a preferred embodiment of my invention has been disclosed, it will be understood that modifications may be made within the spirit and scope of the invention.

I claim:

1. A testing and packing fixture for small incandescent lamps comprising a body provided with a pair of platform guide rails extending therefrom, means on each of said rails for electrically contacting the base shells of a group of lamps, means connecting the bottom portion of said rails for electrically contacting the base contact eyelets of said lamps, and means for completing an electrical testing circuit to said shell contact means and said contact eyelet means.

2. A testing and packing fixture for small incandescent lamps comprising a body provided with a pair of platform guide rails extending therefrom, a base shell contact bar on each of said rails, means connecting the bottom portion of said rails for electrically contacting the base contact eyelets of said lamps and means for completing an electrical testing circuit to said contact bar and said contact eyelet means.

3. A testing and packing fixture for small incandescent lamps comprising a body provided with a pair of platform guide rails extending therefrom, a base shell contact bar on each of said rails, a base contact eyelet plate connecting the bottom portion of said rails and means for completing an electrical testing circuit to said contact bars and said contact eyelet plate.

4. A testing and packing fixture for small incandescent lamps comprising a body provided with a pair of platform guide rails extending therefrom, a base shell contact bar on each of said rails, a base contact eyelet plate connecting the bottom portion of said rails, a combination stop and connecting bar joining the inner portions of said contact bars, and means for completing an electrical testing circuit to said contact bars and said contact eyelet plate.

5. A testing and packing fixture for small incandescent lamps comprising a body provided with a pair of platform guide rails extending therefrom, a base shell contact bar on each of said rails, a base contact eyelet plate connecting the bottom portion of said rails, a combination stop and connecting bar joining the inner portions of said contact bars, a pair of platform side wall ears on the outer portions of each rail and means for completing an electrical testing circuit to said contact bars and said contact eyelet plate.

6. A testing and packing fixture for small incandescent lamps comprising a body provided with a pair of platform guide rails extending therefrom, a base shell contact bar on each of said rails, a base contact eyelet plate connecting the bottom portion of said rails, a combination stop and connecting bar joining the inner portions of said contact bars, a pair of platform side wall ears on the outer portions of each rail, and means for completing an electrical testing circuit to said contact bars and said contact eyelet plate, comprising a microswitch on said body having a contact arm depending therefrom adjacent one of said rails for closing said circuit upon contact with a platform and means for supplying electrical power to said switch, said guide rails and said contact plate.

7. Testing and packing apparatus for small incandescent lamps comprising a table, means adjacent said table for delivering based lamps from a basing machine to said table, and at least one testing and packing fixture, said fixture comprising a body provided with a pair of platform guide rails extending therefrom, means on each of said rails for electrically contacting the base shells of a group of lamps, means connecting the bottom portion of said rails for electrically contacting the base contact eyelets of said lamps, and means for completing an electrical testing circuit to said shell contact means and said contact eyelet means.

8. Testing and packing apparatus for small incandescent lamps comprising a table, means adjacent said table for delivering based lamps from a basing machine to said table, and at least one testing and packing fixture, said fixture comprising a body provided with a pair of platform guide rails extending therefrom, a base shell contact bar on each of said rails, a base contact eyelet plate connecting the bottom portion of said rails, a combination stop and connecting bar joining the inner portions of said contact bars, a pair of platform side wall ears on the outer portions of each rail, and means for completing an electrical testing circuit to said contact bars and said contact eyelet plate, comprising a microswitch on said body having a contact arm depending therefrom adjacent one of said rails for closing said circuit upon contact with a platform, and means for supplying electrical power to said switch, said guide rails and said contact plate.

GEORGE W. CAPLIS.

No references cited.